O. E. ROMARE.
CAMERA.
APPLICATION FILED DEC. 31, 1914.
1,165,129. Patented Dec. 21, 1915.
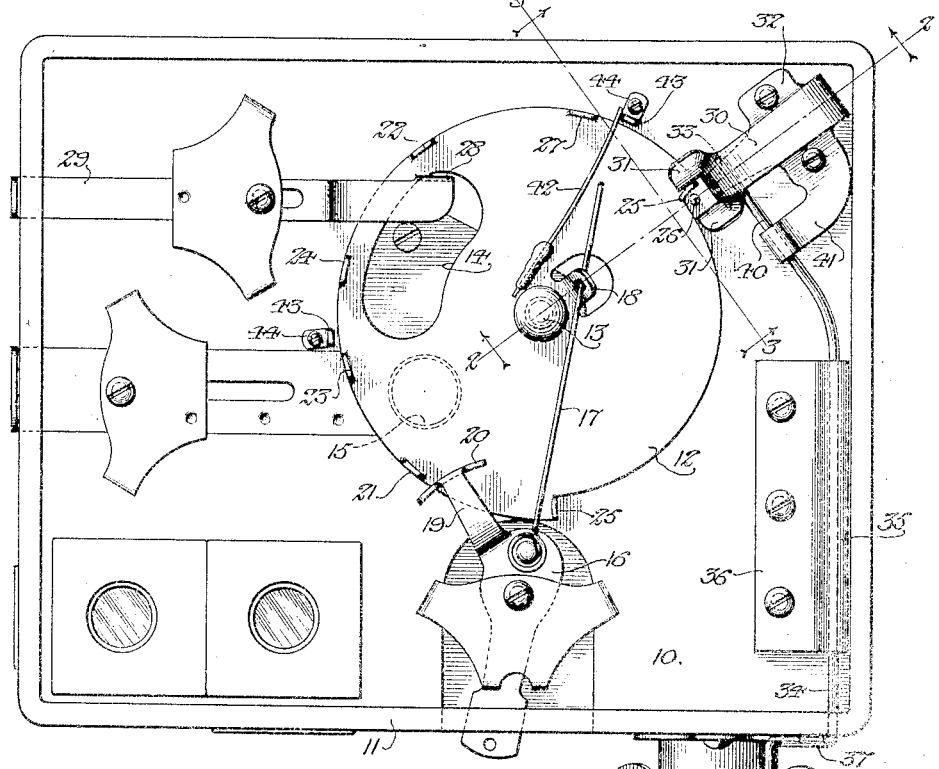
Fig. 1.
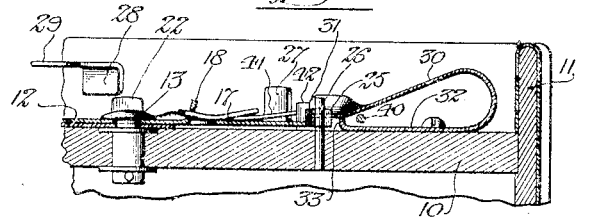
Fig. 2.
Fig. 4.
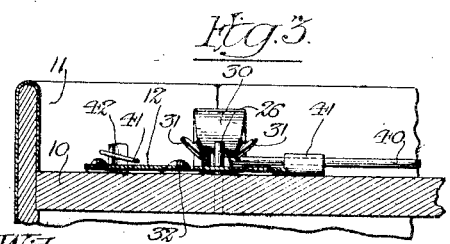
Fig. 3.
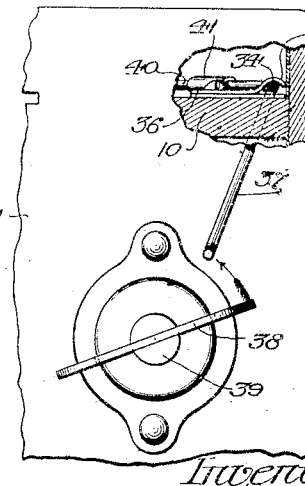
Witnesses:
Inventor
Oscar E. Romare
By Peirce, Fisher & Clapp, Attys.

UNITED STATES PATENT OFFICE.

OSCAR E. ROMARE, OF WILLIAMS BAY, WISCONSIN.

CAMERA.

1,165,129.

Specification of Letters Patent. Patented Dec. 21, 1915.

Application filed December 31, 1914. Serial No. 879,838.

*To all whom it may concern:*

Be it known that I, OSCAR E. ROMARE, a citizen of the United States, and a resident of Williams Bay, county of Walworth, and State of Wisconsin, have invented certain new and useful Improvements in Cameras, of which the following is a full, clear, and exact description.

The invention relates to cameras and seeks to provide simple, efficient means for locking the shutter mechanism against operation after each exposure until the film-feeding device has been operated, thus preventing double exposures.

A further object of the invention is to provide such locking means for the shutter which will operate properly when the shutter mechanism is set either for instantaneous or time exposures.

More particularly the invention seeks to provide such locking means for a shutter which is alternately oscillated back and forth in opposite directions to effect the exposures.

The invention consists in the features of improvement hereinafter set forth, illustrated in the preferred form in the accompanying drawings and more particularly pointed out in the appended claims.

In the drawings, Figure 1 is an end view of a camera with the end plate or cover removed and illustrating the shutter mechanism with the present improvement applied thereto. Figs. 2 and 3 are detailed sections on the lines 2—2 and 3—3 respectively, of Fig. 1. Fig. 4 is a detailed view, partially in elevation and partly broken away, of one corner of the camera.

The improvement may be applied to different forms of cameras and shutter mechanism, but it is particularly applicable to the shutter mechanism illustrated. In the construction shown, the shutter mechanism is mounted upon a transverse plate or board 10 arranged within one end of the box-like body 11 of the camera. In the construction shown, the shutter 12 is in the form of a disk and is pivotally mounted upon the face of the plate 10 by means of a stud or rivet 13, the shutter being provided with a segmental slot 14 which is adapted to register with the lens aperture 15 as the shutter is oscillated. A shift lever 16 for operating the shutter is pivotally mounted upon the board 10 and projects through a slot in the wall of the camera. This lever is connected to the shutter by a spring finger 17, which is rigidly secured to the lever and extends through an up-turned perforated lug 18 on the shutter. The lug 18 is disposed near the pivot of the shutter, so that as the actuating lever is shifted in opposite directions, the shutter is oscillated in opposite directions through the medium of the spring finger 17. The movement of the shutter is controlled by an upwardly bent arm 19 on the inner end of the lever 16, which is provided at its inner end with a segmental stop 20 that coöperates with a series of up-turned lugs 21, 22, 23 and 24 on the edge of the shutter disk. The shutter is also provided with a pair of stop lugs 25, which, at the opposite ends of the movement of the shutter, engage a stop pin 26 on the plate 10. An additional lug 27 on the shutter is arranged to coöperate with an adjustable stop 28 on the inner end of a slide 29, to effect time exposures.

In any position of the shutter, the segmental stop 20 on the actuating lever 16 is adjacent one of the lugs 21, 22, 23 or 24, so that, when the lever is shifted, the spring 17 is placed under tension until the stop is moved past the adjacent lug to permit the quick shift of the shutter by the spring finger 17. In effecting instantaneous exposures, the shutter is alternately shifted back and forth in opposite directions and the stop 20 alternately coöperates with the lugs 21 and 22 at the succeeding exposures. For time exposures, the slide 29 is adjusted to bring the stop 28 in the path of movement of the lug 27, so that the opening movement of the shutter is arrested with the slot 14 in register with the lens aperture 15. The segmental stop 20 then coöperates either with the lugs 21 and 23 or with the lugs 22 and 24.

When the shutter is closed, one or the other stop of the lugs 25 is in engagement with the stop pin 26, and means is provided for locking the shutter mechanism in either one of these positions. For this purpose, a catch 30 is provided. This catch has a pair of inclined ears or lugs 31 which coöperate with the lugs 25 to lock the shutter in either one of its closed positions. The catch is yieldingly spring-held in position so that, as the shutter moves to either closed position, one of the lugs 25 will pass beneath one of the inclined catch lugs 31 into engagement with the stop pin 26. The shutter mechanism is then locked against movement and cannot be again shifted until the spring catch is released.

In the preferred form shown, the catch is in the form of a U-shaped piece of spring metal, the base portion 32 of which is suitably secured to the plate 10. At its inner end, the base 32 is provided with an upturned stop 33 (see Fig. 2) and the inner working portion of the spring catch is yieldingly held in normal position in engagement with this stop.

A releasing shifter is provided for the catch 30. In the form shown, this releasing shifter comprises a rod or shaft 34 which is journaled in a bearing portion 35 formed in a plate 36, the latter being suitably secured to the plate or board 10. At one end, the shaft or rod 34 is provided with a crank 37 which is arranged to be engaged by the film-feeding or winding device. In the form shown, the out-turned end of the crank arm 37 is arranged to be engaged by the finger piece 38 on the outer end of the film winding shaft 39. At its inner end, the rock shaft 34 is provided with a finger 40 which extends beneath the catch 30 and is adapted to lift or release the same when the shaft or rod 34 is rocked by the film winding device. The rock shaft 34 is held in the normal position shown by a spring finger 41 which engages the finger piece 40 at the inner end of the shaft. In the construction shown, this spring finger extends from the base portion 32 of the catch device.

As the catch device is only momentarily raised by the releasing shifter, means are provided for moving the shutter out of range of the catch device, when the latter is released. For this purpose a spring finger 42 is secured at its inner end to the shutter 12, and, at the opposite ends of the movement of the shutter, the outer end of the spring finger is arranged to engage one or the other of a pair of lugs 43. These lugs are preferably in the form of angle pieces secured to the board or plate 10 by screws 44. By loosening the screws the position of the lugs can be adjusted to a limited extent. The spring finger is arranged to engage one of the lugs 43 just before the shutter reaches the end of its movement, so that, in the closed, locked position of the shutter, the spring finger is under a slight tension. Then when the catch device is lifted to disengage one of its lugs from one of the stop lugs 25 of the shutter, the spring finger 42 acts to shift the shutter to a slight extent, so that the lug 25 thereon is moved out of range of the catch lug 31.

In the drawings the shutter mechanism is shown in its closed, locked position and cannot be operated. The movement of the shift lever 16 will merely serve to place the spring finger 17 under tension, but will not shift the shutter disk. In this position, as stated, the spring finger 42 is under a slight tension and the stop 20 on the shift lever is disposed adjacent the lug 21, but the parts are so arranged that the stop 20 and lug 21 are spaced a slight distance apart. Now, if the film winding devices are operated to advance the film, the spring catch is released as described and the shutter is advanced slightly in anti-clockwise direction from the position shown in the drawings, so that the return shift of the catch device, after the finger-piece 38 has passed the crank arm 37, will not again bring the catch lug 31 into locking engagement with stop lug 25 on the shutter. The shift lever 16 may be then operated by a movement toward the right from that shown in the drawings, and the shutter will be oscillated to effect an instantaneous exposure. This shift of the shutter will bring the other stop lug 25 into engagement with the other catch lug 31, and the shutter mechanism is thereby locked in its other closed position. At the same time, the spring finger 42 will engage the other lug 43 and will be placed under slight tension. The catch mechanism thus serves to automatically lock the shutter after each exposure, but is released, when the film-winding device is operated, to permit the next exposure.

In effecting time exposures, the shutter is oscillated from and back to one of its closed positions to successively open and close the lens aperture, by moving the shift lever 16 in opposite directions. At such times, as described, the stop 28 is in the path of movement of the lug 27 and arrests the opening movement of the shutter with the lens aperture exposed. The parts are so disposed that time exposures can be effected by moving the shutter to and from either of its closed positions, and inasmuch as the catch operates in either of the closed positions of the shutter, but is not active when the shutter is in its open position, the mechanism will operate properly when the shutter mechanism is set for time exposures. Inasmuch as the force acting to move the shutter to its closed position is slight, the spring tension on the catch device 30 should also be slight, so that the momentum of the shutter will be sufficient to move one or the other of its stop lugs 25 past one of the stop lugs 31, and also to place the spring finger 42 under a slight tension.

Obviously the improvement may be applied to different forms of shutters and changes may be made in the details set forth without departure from the essentials of the invention as defined in the claims.

I claim as my invention:

1. In a camera, the combination with a shutter mechanism and a film winding device, of a catch constantly spring pressed toward its locking position and arranged to automatically engage and lock said shifter mechanism in closed position, means actuated by said winding device for tripping said catch, and means independent of said winding device for maintaining said shutter mechanism unlocked until it is operated and again closed.

2. In a camera, the combination with a shutter mechanism and a film-feeding device, of a spring-pressed catch for locking said shutter mechanism in closed position, means actuated by said film-feeding device for releasing said catch, and a spring for shifting said shutter mechanism out of range of said catch when the latter is released.

3. In a camera, the combination of a shutter mechanism shiftable back and forth between two closed positions, and adjustable "time" stop device for arresting said shutter mechanism in open position intermediate said closed positions, locking means for said shutter mechanism inoperative in the open position thereof and arranged to automatically engage and lock said shutter mechanism in either of its closed positions, a film feeding device, and means actuated thereby for tripping said locking means.

4. In a camera, the combination of a shutter mechanism, an adjustable time stop device for arresting the shutter mechanism in open position, a part connected to said shutter mechanism and movable therewith to two different positions as said shutter is opened and closed, a catch mounted on a stationary part of the camera and arranged to coöperate with said part in the closed position only of said shutter mechanism to lock the latter against movement, and a film-feeding device arranged to release said catch.

5. In a camera having a lens aperture, the combination of a shutter having a lug fixed thereto, means for shifting said shutter back and forth to open and close said lens aperture, a spring actuated catch arranged to automatically engage the lug on said shutter to lock the latter in closed position, a film winding device, and a releasing trip for said catch arranged to be actuated by said film winding device.

6. In a camera, the combination of a shutter having a lug thereon, means for shifting the same back and forth, a spring-held catch coöperating with said lug for locking said shutter in closed position, a film-winding device and a spring-held releasing shifter for said catch arranged to be actuated by said film-winding device.

7. In a camera, the combination of a shutter mechanism, actuating means therefor, a spring-held catch for locking said shutter mechanism in closed position, a film-feeding device, means actuated thereby for releasing said catch, and a spring for shifting said shutter mechanism out of range of said catch when the latter is released.

8. In a camera, the combination of a shutter having a lug thereon, an actuating shifter therefor, a spring-held catch coöperating with said lug to lock said shutter in closed position, a film-feeding device arranged to release said catch, and a spring for moving said lug out of the range of said catch when the latter is released.

9. In a camera, the combination of a shutter, means for shifting said shutter back and forth between two closed positions, means for locking said shutter in either closed position, a film-winding device, means controlled thereby for releasing said locking means, and spring means for shifting said shutter from either closed position out of the range of said locking means when the latter is released.

10. In a camera, the combination of a shutter having two stop lugs thereon, a stop pin coöperating with said lugs for arresting the shutter in two closed positions, a catch coöperating with said stop lugs for locking said shutter in said closed positions, a film-winding device and means controlled thereby for releasing said catch.

11. In a camera, the combination of a shutter having two stop lugs thereon, a stop pin coöperating with said lugs for arresting the shutter in two closed positions, a catch coöperating with said stop lugs for locking said shutter in said closed positions, a film-winding device and means controlled thereby for releasing said catch, and a spring connected to said shutter for shifting the same from either position out of range of said catch when the latter is released.

12. In a camera, the combination of a shutter, means for moving said shutter from and to closed position, a spring-held catch for locking said shutter in closed position, film-winding devices arranged to release said catch, a spring for shifting said shutter out of range of said catch when the latter is released, and means for placing said spring under tension as said shutter is moved to closed position.

13. In a camera, the combination with an oscillating shutter disk, actuating devices therefor and an adjustable time stop for arresting said shutter disk in open position, of an automatically acting catch device for locking said shutter disk in closed position, said catch device being inoperative in the open position of said shutter, a film feeding device, and a releasing trip for said catch actuated by said film feeding device.

14. In a camera, the combination with a pivotally mounted shutter disk, means for oscillating said disk between two different closed positions and an adjustable time stop for arresting the shutter mechanism in open position intermediate its closed positions, an automatically acting catch device for locking said shutter disk in either of its open positions, said catch device being inoperative in the closed position of said shutter disk, a film winding device, and a releasing trip for said catch arranged to be actuated by said film winding device.

15. In a camera, the combination with an oscillating shutter disk, actuating means therefor and an adjustable time stop for arresting said shutter disk in open position, an automatically acting catch device arranged to coöperate with said shutter disk in its closed position only to lock the same against movement, a film feeding device, means actuated thereby for tripping said catch, and means for maintaining said shutter disk unlocked until it is operated and again returned to closed position.

16. In a camera, the combination with a pivotally mounted shutter disk, means for oscillating the same, means for operating said shutter disk between two closed positions, and an adjustable time stop for arresting said shutter disk in open position intermediate its closed positions, of an automatically acting catch device arranged to coöperate with said shutter disk in either of its closed positions to lock the same against movement, said catch device being inoperative in the open position of said shutter disk, a film winding device, means actuated thereby for tripping said catch device, and means for maintaining said shutter disk unlocked until it is again operated and returned to one of its closed positions.

17. In a camera, the combination with a pivotally mounted shutter disk, means for oscillating the same between two closed positions, an adjustable stop device for arresting it in open position intermediate its closed positions, of a spring actuated catch arranged to automatically engage and lock said shutter disk in either of its closed positions, said catch device being inoperative in the open position of said shutter disk, a film winding device, a trip for said catch actuated by said film winding device, and a spring for shifting said shutter disk out of range of said catch device when the latter is closed.

OSCAR E. ROMARE.

Witnesses:
 EDWIN B. FROST,
 FRANK R. SULLIVAN.